July 25, 1933.  S. MIYAMOTO  1,919,960
REGULATOR CONTROL SYSTEM
Filed Feb. 16, 1932
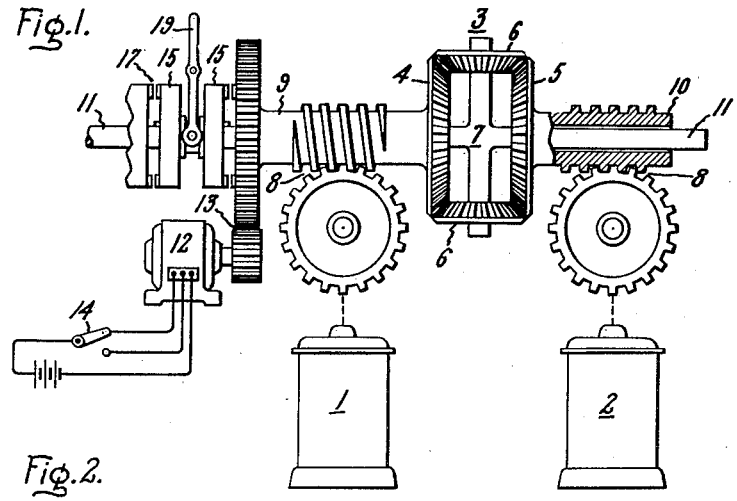
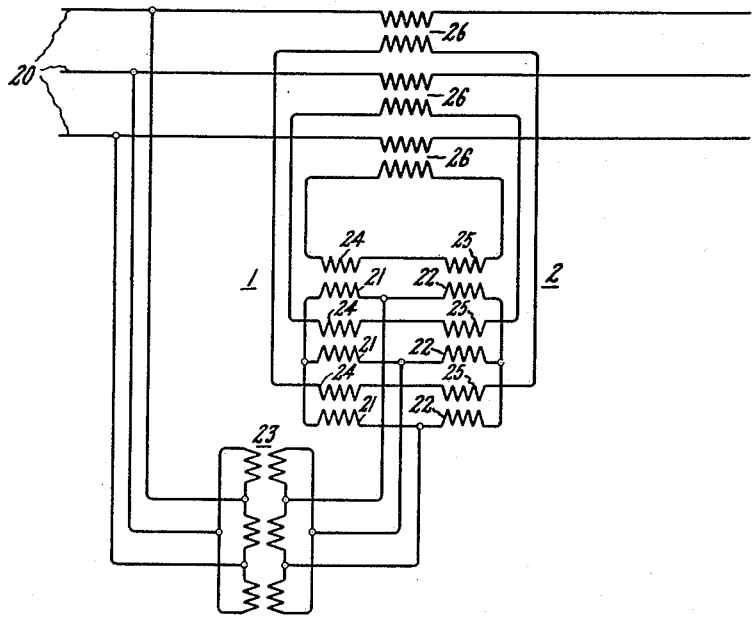
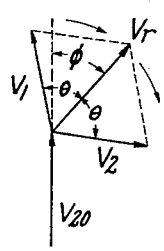
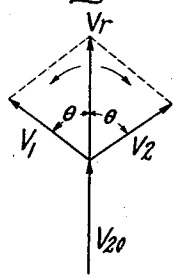
Inventor:
Shigenari Miyamoto,
by Charles V. Mullen
His Attorney.

Patented July 25, 1933

1,919,960

UNITED STATES PATENT OFFICE

SHIGENARI MIYAMOTO, OF TOKYO, JAPPAN, ASSIGNOR TO GENERAL ELECTRIC COMPANY, A CORPORATION OF NEW YORK

REGULATOR CONTROL SYSTEM

Application filed February 16, 1932, Serial No. 593,268, and in Japan June 20, 1931.

My invention relates to regulator control systems and more particularly to an improved system for controlling the operation of a pair of induction voltage regulators.

It is often desirable to regulate the phase angle of a regulated quantity in addition to regulating the magnitude of this quantity. This is particularly true where the regulated quantity is voltage. For example, there are many cases in synchronous alternating current distribution systems where there are a plurality of parallel circuits interconnecting a source of current supply and a load. If the load is a variable one which requires substantially constant voltage for best operation, it is desirable, and usually necessary, to provide means for regulating the magnitude of the voltage of the circuits so as to compensate for the variable voltage drop in the circuits which is caused by the load current variations. If the parallel circuits are of unequal length, or if they have different electrical constants, it is also desirable to provide regulating means for varying the phase angle of the voltage of at least one of the circuits, for by doing this the distribution of real power flow between the several parallel connected circuits may be controlled or equalized. The reason that voltage phase angle variation controls the distribution of power flow is that, as the voltages at the load ends of the circuits must be equal and in phase with each other, there will always have to be a distribution, or ratio, of the currents in the circuits which is such that the effective voltage drop in the circuit including the out of phase regulating voltage is equal in magnitude and phase to the effective voltage drop in the other circuit. As the resistance of most power transmission circuits is small in comparison with their reactance it is largely the in-phase, or power, components of the currents which must adjust themselves so as to produce unequal actual voltage drops which, when the quadrature component of the voltage which was inserted is considered, result in equal effective voltage drops. The importance of arrangements for controlling both the magnitude and phase angle of the voltage of an alternating current circuit is increasing due to the growing tendency toward interconnection of generating stations. These interconnections often take the form of a closed loop so that between any load and any generating station there will be two parallel power circuits, which usually will be of unequal lengths.

One way of controlling both the magnitude and phase angle of the voltage of a polyphase circuit is by means of a pair of induction voltage regulators having their secondary windings connected in series in the polyphase circuit. An understanding of why a polyphase induction regulator connected in the above manner will produce the above results, can best be had from a consideration of the structure and operation of such regulators. A polyphase induction regulator consists essentially of axially aligned, relatively rotatable, inductively related, distributed, polyphase primary and secondary windings connected, respectively, (directly or indirectly) across and in a polyphase circuit to be regulated. It thus follows that the voltage induced in the secondary winding, by the primary winding, is caused by the rotating magnetic fields produced by the primary winding. The result is that the magnitude of the voltage induced in the secondary winding is constant regardless of the angular position of the secondary winding with respect to the primary winding, and only the phase of the induced secondary voltage, with respect to the primary voltage, is varied by rotating the windings with respect to each other. Thus, as each regulator inserts in the circuit a constant magnitude voltage which is variable in phase, the resultant of these two voltages may be varied in both magnitude and phase by merely varying the phase of the respective regulator voltages which constitute its components.

In accordance with my invention I provide a control arrangement for a pair of polyphase induction regulators whereby they may be made selectively to vary the magnitude of the resultant regulating voltage without varying its phase or vary the phase of the resultant regulating voltage without changing its magnitude.

An object of my invention is to provide a novel regulator control arrangement.

Another object of my invention is to provide improved means for simultaneously operating a pair of polyphase induction regulators whose secondary windings are connected in series.

A further object of my invention is to provide simple and reliable means for causing the operation of a pair of polyphase induction regulators at the same speed and in selectively relatively reversible directions.

My invention will be better understood from the following description taken in connection with the accompanying drawing, and its scope will be pointed out in the appended claims.

In the drawing, Fig. 1 is a detailed illustration of an operative embodiment of my invention; Fig. 2 illustrates the electrical connections of the regulators with which my invention is employed, while Figs. 3 and 4 are vector diagrams for explaining the operation of my invention.

Referring now to Fig. 1 of the accompanying drawing, 1 and 2 are a pair of polyphase induction voltage regulators which are interconnected by motion transmitting apparatus 3. Apparatus 3 consists essentially of a mechanical differential consisting of a pair of differential gears, 4 and 5, which are arranged to mesh with pinion gears 6, mounted on the arms of a spider 7. These elements constitute the usual elements of a mechanical differential. Regulators 1 and 2 are connected to turn with the differential gears 4 and 5, respectively, by means of any suitable gearing, or motion transmitting means, such as the worm and gear connections 8, which have been illustrated. Differential gears 4 and 5 are mounted on hollow shafts, 9 and 10, through which runs the shaft 11 of the spider 7.

A suitable source of rotation, such as an electric motor, may be connected to operate either one, or both, of the two regulators, or either one, or both, of the two differential gears, and as illustrated a motor 12 is connected by means of suitable gearing 13, to operate the differential gear 4. The motor 12 is an ordinary reversible electric motor and, as shown, is connected to be energized from a suitable source of current supply and to have its direction of rotation automatically or manually controlled by means illustrated as a manually-operated circuit controller 14.

A clutch member is provided for selectively locking spiders 7 to one of the differential gears or for locking it against any rotation. As shown, this means consists of a two way dog clutch member 15, which is slidably splined to the shaft 11 and which is adapted for engagement with one of the gears of the gear train 13 which is connected to the differential gear 4 when it is in one extreme position, and to engage a stationary dog 17 when it is in the other extreme position. A suitable pivotally mounted lever 19 is provided for controlling the clutch.

The operation of the arrangement illustrated in Fig. 1 is as follows: If the operating handle of lever 19 is thrown to the left, the clutch member 15 engages the gear 13 on the hollow shaft 9 of the differential gear 4, which may either be provided with lugs, or slots, for engagement with the lugs of the member 15. Consequently, shaft 11 of spider 7 is locked against relative rotation with respect to the differential gear 4. If motor 12 is now started, the hollow shaft 9 will turn and will drive the regulator 1 through the gearing 8. As spider 7 turns with differential gear 4, the pinions 6 will be prevented from rotating on their axes and consequently differential gear 5 must turn with differential gear 4, thereby operating regulator 2 at the same speed and in the same direction as regulator 1. Obviously if motor 12 is reversed, both regulators will also be reversed in operation.

If now the handle of the lever 19 is thrown to the right, clutch member 15 will engage the stationary dog 17, thereby locking the spider 7 from rotation. If motor 12 is operating regulator 1 will be driven as before and the rotation of differential gear 4 will cause the pinions 6 to turn on their axes due to the fact that their axes are now fixed. The result will be that pinion 6 will drive the differential gear 5 in the opposite direction, thereby reversing the direction of operation of regulator 2. Consequently, both regulators will now be operating at the same speed but in relatively opposite directions. By reversing the operation of motor, the operation of each of the regulators will be reversed.

In Fig. 2 are shown the electrical connections of the regulators 1 and 2 when they are operated in accordance with my invention. In this figure, 20 is a three phase alternating current circuit, the phase and magnitude of whose voltage are regulated by means of the regulators 1 and 2. The primary windings 21 and 22 of the regulators 1 and 2, respectively, are connected in parallel with each other and are preferably excited by means of a suitable three phase exciting transformer 23 connected across the phases of circuit 20. The secondary windings 24 and 25 of regulators 1 and 2, respectively, are connected in series with each other and are connected in circuit 20 by means of a suitable three phase series transformer 26.

Fig. 3 illustrates the operation of the arrangement illustrated in Figs. 1 and 2 when it is desired to vary the phase angle of the regulating voltage without varying its magnitude. In this figure $V_{20}$ is the voltage of circuit 20 on the generator side of the regulators, $V_1$ and $V_2$ are the voltages of the respective regulators, while $V_r$ is their resultant voltage which is inserted in circuit 20 by means of the series transformer 26. In this figure the phase angle $\phi$ of the regulated voltage $V_r$ is being increased without changing its magnitude and consequently the voltage vectors $V_1$ and $V_2$ are rotating in a clockwise direction at the same speed. This corresponds to the operation of Fig. 1 when the handle 19 of the clutch is thrown to the left.

In Fig. 4 is illustrated the operation of the arrangement illustrated in Figs. 1 and 2 when it is desired to vary the magnitude of the regulated voltage $V_r$ without varying its phase. This is done by rotating the voltage vectors $V_1$ and $V_2$ in relatively opposite directions at the same speed. This corresponds to the operation of Fig. 1 when the clutch handle 19 is thrown to the right thereby locking the spider 7 from rotation. As illustrated in Fig. 4, the voltage $V_r$ is being reduced by increasing the phase angle between the voltages $V_1$ and $V_2$. By reversing motor 12 and thereby reducing the phase angle between the voltages $V_1$ and $V_2$ the magnitude of the voltage $V_r$ may be increased without changing its phase angle.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. In combination, a pair of polyphase induction regulators for respectively producing one of a pair of variable phase angle regulating quantities having a vector resultant, and means for simultaneously operating said regulators in a manner to vary the phase of said resultant while maintaining its magnitude constant.

2. In combination, a pair of polyphase induction voltage regulators, and means for selectively causing operation of said regulators at the same speed and in the same direction or at the same speed and in opposite directions.

3. In combination, a pair of polyphase induction voltage regulators, a source of power connected to rotate one of said regulators, and means including a differential mechanism for selectively causing the other regulator to be rotated in either direction at the same speed as the first regulator.

4. In combination, a polyphase electric circuit, a pair of induction voltage regulators having their secondary windings connected in series relation in said circuit, and means for selectively causing the simultaneous operation of said regulators at the same speed but in relatively reversible directions.

5. In combination, a pair of polyphase induction regulators, a mechanical differential having a pair of differential gears and a spider, operating connections between each regulator and a different one of the differential gears of said differential, and means for selectively locking the spider of said differential from rotation or for locking it to one of the differential gears.

6. In combination, a pair of three phase induction voltage regulators, a mechanical differential having a pair differential gears and a spider, operating connections between each of the differential gears of said differential and a different one of said regulators, a motor for driving one of said differential gears, and a two-way clutch for selectively locking the spider of said differential against rotation or to one of said differential gears.

7. In a voltage regulating system, a three phase power circuit, a pair of three phase induction voltage regulators connected to said circuit with their primary windings in parallel and their secondary windings in series, a motor for operating one of said regulators, and a selectively reversible mechanical operating connection for driving the other regulator from the first one.

8. In combination, a pair of transformers each of which has a polyphase primary winding and a secondary winding relatively rotatable with respect to its associated primary winding, and means for simultaneously causing relative rotation of the windings of each of said transformers at the same speed but selectively in the same or opposite relative directions.

9. In combination, a pair of transformers each of which has a polyphase primary winding and a secondary winding which is relatively rotatable with respect to its associated primary winding, means for exciting said primary windings, a circuit including said secondary windings in series, and means for simultaneously causing relative rotation of the windings of each of said transformers at the same speed but selectively in the same or opposite relative directions.

SHIGENARI MIYAMOTO.